United States Patent

[11] 3,558,047

| [72] | Inventors | Hans Wolfgang Nuernberg;<br>Gerhard Wolff, Juelich, Germany |
|---|---|---|
| [21] | Appl. No. | 705,606 |
| [22] | Filed | Feb. 15, 1968 |
| [45] | Patented | Jan. 26, 1971 |
| [73] | Assignee | Kernforschungsanlage Juelich G.m.b.H.<br>Juelich, Germany |
| [32] | Priority | Feb. 17, 1967 |
| [33] | | Germany |
| [31] | | K61481 |

[54] ENERGY CONVERSION METHOD
12 Claims, No Drawings

[52] U.S. Cl. .................................................. 237/12,
48/197; 176/39; 176/92
[51] Int. Cl. ....................................................... F24d 7/00
[50] Field of Search ........................................... 23/1EB; -
176/(Inquired), 39

[56] References Cited
UNITED STATES PATENTS

| 2,266,033 | 12/1941 | Harrison ...................... | 23/1EX |
|---|---|---|---|
| 2,280,673 | 4/1942 | Thomas ...................... | 23/1EX |
| 2,283,832 | 5/1942 | Thomas ...................... | 23/1 |
| 2,759,805 | 8/1956 | Erickson ...................... | 23/1EX |
| 3,125,159 | 3/1964 | Lindberg, Jr. ............... | 165/86 |
| 3,231,336 | 1/1966 | Lindberg, Jr. ............... | 23/281X |
| 3,075,361 | 1/1963 | Lindberg ...................... | 165/1X |
| 3,116,212 | 12/1963 | Lindberg ...................... | 176/39 |

*Primary Examiner*—Edward J. Michael
*Attorney*—Michael S. Striker

ABSTRACT: The energy obtained by operation of a high temperature nuclear reactor is utilized by heating in the operating high temperature nuclear reactor a heat exchange medium to a sufficiently high temperature so that by indirect heat exchange between the thus-heated heat exchange medium and a suitable reactant an endothermic chemical reaction of the reactant or reactants may be maintained. Such endothermic reaction is carried out and thereby a reaction product is formed which may be reconverted into the initial reactant or reactants by being subjected to an exothermic reaction. Whenever heat is required, the reaction product is subjected to exothermic reaction in indirect heat exchange with a medium which is to be heated. Thereby heat derived from the operation of the high temperature nuclear reactor can be made available at any desired time by carrying out the exothermic reaction under simultaneous reconversion of the reaction product into the reactant or reactants, and the latter may then be again subjected to the endothermic chemical reaction by indirect heat exchange with the heat exchange medium which has been heated in the high temperature nuclear reactor.

ENERGY CONVERSION METHOD

BACKGROUND OF THE INVENTION

The present invention relates to an energy conversion method and is particularly concerned with a method for storing and subsequently utilizing heat energy which is derived from energy produced in a high temperature nuclear reactor by radioactive radiation or the effect of neutrons. Since the heat energy cannot be stored as such and generally it is also not possible, or only possible with special precautions, to store energy which is produced by radioactive radiation, i.e. alpha, beta or gamma radiation or by the effect of neutrons, it is generally necessary that the devices for utilizing the thus-produced energy are arranged in the immediate vicinity of such high temperature nuclear reactor.

In order to be able to utilize the energy produced in such nuclear reactor at points which are located at a substantial distance from the reactor, it has been generally necessary up to now to convert the heat energy obtained by operation of the high temperature nuclear reactor by means of heat exchangers and current-producing devices into electric energy which may then be conveyed to the consumer station in the form of an electric current. However, to proceed in this manner is connected with the serious disadvantage that the effectiveness or energy yield of the entire arrangement amounts to only relatively small fractions of the energy originally produced by operation of the high temperature nuclear reactor.

It is therefore an object of the present invention to provide a method which will permit in a simple and economical manner to convert heat energy obtained in a high temperature nuclear reactor by radioactive radiation or neutrons into a form which may be stored and transported to the consumer with a relatively small energy loss so that thereby the yield or effectiveness of the high temperature nuclear reactor-energy consuming device system is substantially increased.

It is furthermore an object of the present invention to provide a simple and economical method for transporting energy derived from a high temperature nuclear reactor over great distances and without thereby incurring substantial losses so that also several consumer stations may obtain their heat requirements from one and the same high temperature nuclear reactor.

High temperature nuclear reactors are generally characterized by utilizing a gas as the cooling or heat exchange medium, preferably helium, and by a temperature of the reactor process of 750° C. or higher. Furthermore, generally, the fuel elements in such type of reactor are not located in metallic casings.

SUMMARY OF THE INVENTION

Energy obtained by operation of a high temperature nuclear reactor is utilized by a method which comprises heating in the high temperature nuclear reactor a heat exchange medium to a temperature sufficiently high to sustain an endothermic chemical reaction, causing indirect heat exchange between at least one reactant capable of being subjected to the endothermic chemical reaction and the thus-heated heat exchange medium so as to cause the endothermic reaction to proceed under formation of a reaction product capable of being reconverted into the at least one reactant by being subjected to an exothermic reaction; and carrying out the exothermic reaction of the reaction product in indirect heat exchange with a medium to be heated at a time when heating of the medium is desired, so that the medium will be heated with heat freed by the exothermic reaction and simultaneously the at least one reactant will be reformed.

Thus, for instance ethane or propane may be decomposed at a temperature of about 900° C. to yield hydrogen and either ethylene or propylene. The thus-obtained reaction products may then be recombined at temperatures below 400° C. in an exothermic reaction and the heat freed by such exothermic reaction used for a desired purpose. The mixture of reaction products, for instance ethylene and hydrogen, may be easily transported, even over substantial distances, to the consumer station where heat produced by the exothermic reconversion to ethane is to be utilized, and the thus-reformed ethane may be then easily recycled to the high temperature nuclear reactor station to be decomposed there in an endothermic reaction utilizing heat derived from the operation of the high temperature nuclear reactor.

DESCRIPTION OF THE PREFERRED EMBODIMENTS

According to the present invention, energy produced in a high temperature nuclear reactor such as heat energy or energy produced by the effect of neutrons or radioactive radiation is conveyed in a manner known to those skilled in the art to a cooling agent such as helium or carbon dioxide which flows through the reactor core. The heat energy taken up by the cooling agent is then supplied by indirect heat exchange to a material which by being thus heated will be chemically reacted, generally decomposed under absorption of heat, i.e. in an endothermic reaction.

The endothermic reaction may be carried out in the presence of a conventional catalyst therefore. According to the present invention, the thus-obtained reaction products are stored jointly or separately and are then conveyed to the consumer station preferably after having been cooled to a temperature below the temperature at which the endothermic reaction would be reversed and in an exothermic manner the original reactant or reactants would be produced. At the consumer station where heat is to be utilized, the reaction products are subjected to an exothermic reaction which will reform the original reactants under release of heat which heat is then utilized, for instance by indirect heat exchange at the consumer station.

If, as frequently is advantageous, the reaction products are conveyed to the consumer station in the form of a mixture thereof as originally produced in the endothermic reaction, it is sometimes advantageous to admix to such mixture of reaction products per se known agents which will serve to dilute the mixture of reaction products or to retard or impede the recombination of the reaction products to form the original reactant or reactants.

It is particularly economical to carry out the method of the present invention in such a manner that after forming the original reactants in the exothermic reaction at the heat consuming station, the thus-formed original reactants are reconveyed to the high temperature nuclear reactor station so that the endothermic formation of the reaction products from the reactants and the exothermic formation of the reactants from the reaction product is carried out in a closed cycle. The recombination of the reaction products in an exothermic reaction for forming the original reactants may be carried out in the presence of a conventional catalyst for such exothermic reaction.

It is one of the advantages of the present invention that it permits in a simple and effective manner to operate a high temperature nuclear reactor as the source of the energy which is to be stored without requiring the interposition of a circulating cooling medium and a heat exchanger which conveys heat from the cooling medium to a heat exchange medium, for endothermic decomposition of the reactant, i.e., a material such as ethane which may be endothermically split under formation of ethylene and hydrogen. As will be described in more detail below the thus obtained mixture of for instance ethylene and hydrogen may be transported and/or stored and when desired may be exothermically recombined to form ethane whereby, due to the exothermic nature of the last mentioned reaction, heat will be made available for any desired purpose.

It is a further advantage of the process of the present invention that the reaction products formed by the endothermic reaction may be conveyed in conventional manner, for instance in gaseous or liquid form through suitable conduits, to the heat consuming station. At the heat consuming station the original reactant, for instance, ethane, is formed by the exothermic combination of ethylene and hydrogen, and the thus formed ethane may then be recycled to the high temperature nuclear reactor station to be again decomposed there in an endothermic reaction to form ethylene and hydrogen.

It has been proposed previously to convey heat without loss of the heat carrier material. However, according to these conventional methods only the sensible heat of a material is utilized, for instance by producing steam and then withdrawing heat from the steam by indirect heat exchange, the thus formed water then being again heated under formation of steam.

These conventional heat conveying methods are connected with certain difficulties and disadvantages, particularly when the heat producer and heat consumer are located at a substantial distance from each other. In such cases special measures have to be taken to prevent unbearable energy losses, i.e., heat losses prior and during transportation of the heated medium. Other methods according to which the heat at the consumer station is made available in such a manner that the material such as a fuel is lost thereby are connected with additional disadvantages such as the production of noxious or dangerous decomposition products which must be treated or eliminated in order to prevent undue contamination of air or waste waters.

The process of the present invention has the substantial advantage that much more effective storing of releasable heat is carried out by forming the reaction products of the endothermic reaction, far more effective than sensible heat transfer, and the carrier material, i.e., the reactants of the endothermic reaction and the reaction products formed thereby which upon exothermic reaction are reconverted into the original reactants, can be recycled practically without losses. No additional measures are needed to prevent energy losses during the transportation or circular flow of reactants-reaction products. Thus, the costs of such additional measures will not be incurred. Furthermore, the entire problem of elimination of waste products is avoided. It is particularly advantageous that by proceeding in accordance with the present invention the energy produced in a high temperature nuclear reactor can be transported over long distances in a highly economical manner by passing the reactants and reaction products in gaseous or liquid form through conventional tubular conduits.

According to preferred embodiments of the present invention, the storage and release of energy produced in the high temperature nuclear reactor is carried out with utilization of ethane ($C_2H_6$) or propane ($C_3H_8$) as the reactant which is endothermically decomposed. However, the present invention is not to be considered limited to utilization of the two above mentioned reactants.

Thus, for instance in accordance with a preferred embodiment of the present invention, ethane is decomposed at a temperature of 900° C. and at atmospheric pressure into ethylene ($C_2H_4$) and hydrogen ($H_2$). This reaction is carried out in accordance with the following equation: $C_2H_6 \rightleftarrows C_2H_4 + H_2$. Disregarding the heat required for heating the reaction vessel, 37 kcal will be required for decomposition of one mole of ethane. It is particularly advantageous to use for the decomposition of ethane a catalyst formed of a mixture of three moles zinc oxide, two moles chromium oxide and one mole uranium oxide. However, good results are also achieved with conventional catalysts of noble metal or nickel. The thus formed mixture of ethylene and hydrogen is withdrawn from the reaction vessel in which the decomposition of the ethane is carried out and passed through a conventional cooler in which the mixture is very quickly cooled to below 400° C. in order to practically eliminate reversal of the decomposition reaction. The sensible heat which is thus withdrawn from the ethylene-hydrogen mixture may of course be utilized in conventional manner.

In many cases it is advantageous to cool the mixture of ethylene and hydrogen to ambient temperature, i.e., for instance to about 25° C., since transportation of the gaseous mixture at ambient temperature can be carried out in a very simple manner and, furthermore, more sensible heat is immediately made available.

However, on the other hand, if the ethylene-hydrogen mixture is to be transported only for a relatively short distance, the mixture may also be conveyed at or near its initial temperature of 900° C. and the recombination of the mixture, i.e., the reaction products to form the reactant, i.e., ethane, may then be carried out at a temperature of about 900° C. and an elevated pressure of about 60 atmospheres.

It has been found that at temperatures below 400° C. the ethylene-hydrogen mixture is stable without requiring the introduction of any diluents or inhibitors for prevention of premature conversion into ethane. Consequently, it is possible to convey the ethylene-hydrogen mixture to the heat consumer station without separating the mixture into its two constituents. However, the present invention is not to be considered limited to any specific manner in which the reaction products formed by endothermic reaction, such as decomposition of the original reactant or reactants, are conveyed to the heat consumer station where the reaction products are reconverted in an exothermic reaction to form again the original reactants.

It is of course also possible, in order to assure the chemical stability of the ethylene-hydrogen or the like mixture for prolonging periods of time, to introduce into the mixture when leaving the reaction vessel in which the mixture has been formed or at any desired point of the conduit through which the mixture is passed to the heat consumer, other materials, for instance nitrogen or noble gases which will serve to impede, retard or, if necessary, control the rate of the exothermic reaction of the mixture under reconstitution of ethane. At least 34 kcal are freed for each mole of ethane formed by the recombination of ethylene and hydrogen.

The recombination of the ethylene-hydrogen mixture under formation of ethane is preferably carried out in the presence of the same type of catalysts which preferably are used for the decomposition of ethane. The exothermic reaction is preferably carried out at a temperature above 400° C.

The thus reformed ethane is then reconveyed into the high temperature nuclear reactor or into the reaction vessel which is heated with energy derived from the high temperature nuclear reactor and in which the decomposition into ethylene and hydrogen is repeated. To proceed in this manner, as pointed out above, has the great advantage that the system (1) ethane—(2) ethylene-hydrogen can be kept in circulation practically without losses and will serve only as carrier of energy from the high temperature nuclear reactor to the heat consuming station. The heat which is freed at the heat consuming station by the formation of ethane may then be used in conventional manner for operating stationary as well as movable heat consuming devices.

According to another preferred embodiment, the reactant is propane and the reaction products are propylene and hydrogen, formed at a temperature of 900° C. and atmospheric pressure in accordance with the equation $C_3H_8 \rightleftarrows C_3H_6 + H_2$. The thus formed gaseous mixture is then exothermically recombined at the heat consuming station at a temperature of preferably about 400° C. The particularly high effectiveness of utilizing propane as the endothermically decomposable reactant will be understood from the fact that for decomposition of propane an amount of heat corresponding to $W_p(900° C.) = 35$ kcal/mole is required and that upon recombination of propylene and hydrogen under formation of propane, an amount of heat equal to $W_p(400° C.) = 30.78$ kcal/mole will be freed.

Thus, the energy produced in the high temperature nuclear reactor is most advantageously stored, conveyed and used by combining the operation of the reactor with a reversible endothermic-exothermic chemical reaction. Thereby, it is possible to utilize the nuclear energy produced in the high temperature nuclear reactor in a particularly effective and economical manner. A considerable portion of the nuclear energy is stored in the form of chemical reaction enthalpy in a medium which can be easily transported over long distances (60 miles and more) at ambient temperature and which energy can be made available at the consumer station in the form of heat for use in conventional heat consuming installations of for instance the heavy industry, chemical industry, power plants or district heating systems. Since the heat conveying medium is not subjected to combustion, no waste gas or waste water problems are caused and the entire process can be carried out continuously in a closed cycle. As heat conveying medium, particularly organic compounds and their decomposition products have been found to give very good results, for instance the above mentioned decomposition and recombination of ethane and propane.

The following examples are given as illustrative only without, however, limiting the invention to the specific details thereof.

EXAMPLE 1

A high temperature nuclear reactor with a thermal output of 30 megawatt is cooled with helium which enters the reactor at a temperature of 500° C. and leaves the reactor at a temperature of 1000° C. The flow of helium equals 13 kg/sec. The hot helium is passed in countercurrent, indirect heat exchange with ethane, the latter entering the heat exchanger at a temperature of 20° C. and being heated therein to 900° C., whereby, in the presence of a catalyst formed of three moles zinc oxide, two moles chromium oxide and one mole uranium oxide, 90 percent of the ethane is decomposed into ethylene and hydrogen. During the countercurrent, indirect heat exchange, the helium is cooled to 560° C. and is then recycled into the high temperature nuclear reactor entering the latter, due to unavoidable heat losses, at a temperature of about 500° C. Under the above described conditions, preferably about 6.5 kg ethane per second are introduced into the indirect heat exchanger whereby for each kilogram of ethane 1100 kcal will be taken up. The thereby formed gaseous mixture of ethylene and hydrogen is cooled in a conventional cooler, utilizing water or other cooling fluids, to a temperature of about 100° C., in order to prevent premature recombination of the constituents of the mixture. By such, preferably indirect, cooling 200 kcal are given up by each kilogram of the mixture of ethylene and hydrogen.

The thus cooled gaseous mixture is passed in conventional manner through a tubular conduit to the heat consuming station at which the mixture is recombined to ethane in the presence of the above mentioned catalyst or of a non-pyrophoric Raney-nickel catalyst. This exothermic reaction is carried out in a conventional heat exchanger, whereby per kilogram of the reacted gaseous mixture at a temperature of about 400° C. 870 kcal are made available.

EXAMPLE 2

In a model operation, 30 grams ethane were reacted at a temperature of 900° C. and atmospheric pressure in the presence of a catalyst consisting of three moles zinc oxide, two moles chromium oxide and one mole uranium oxide. The reaction was carried out in an oven which was geometrically constructed similar to a high temperature nuclear reactor and in which the gas was directed along a path similar to that in a high temperature nuclear reactor. 93 percent of the ethane were decomposed into ethylene and hydrogen. The speed of flow of the ethane was adjusted to 3 grams per second and 1.1 kcal were absorbed per gram of ethane. The thus formed gaseous mixture was cooled in a coil-pipe indirect cooler with water as the cooling medium, to a temperature of 400° C., whereby 0.25 kcal per gram of gaseous mixture were taken up by the cooling medium. The gaseous mixture was then conveyed through a pipeline to the heat consumer and there recombined to form ethane. The yield of ethane was more than 98.4 percent of the theoretical yield.

The heat consumer was formed as a calorimeter in which, in a tube, cylindrical catalyst bodies of nonpyrophorous Raney-nickel were located. The pressed catalyst bodies had a height and diameter of 5 mm respectively. The heat measured in the calorimeter amounted to 0.85 kcal per gram of gaseous mixture. Thus, per mole of reformed ethane about 29 kcal were freed.

The thermodynamically available enthalpy amounts to 34 kcal/mole whereas at temperatures < 400° C., due to losses in carrying out these tests only about 29 kcal per mole of formed ethane were obtained, still a very satisfactory result.

EXAMPLE 3

The process as described in Example 2 was carried out with 44 grams propane, which at 900° C. and atmospheric pressure were decomposed to 95 percent into propylene and hydrogen. The speed of flow was 4.4 grams propane per second and heat was taken up in an amount of 0.79 kcal per gram. After cooling to 400° C. and recombining of the gaseous mixture of propylene and hydrogen to propane in a calorimeter, a yield of 0.57 kcal per gram of gaseous mixture was obtained.

It is also possible to obtain a high heat yield by recombining ethylene and hydrogen to ethane or propylene and hydrogen to propane at higher temperatures and correspondingly higher pressures, for instance at 900° C. and 60 atmospheres.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

We claim:

1. A method of utilizing energy obtained by operation of a high temperature nuclear reactor, comprising the steps of heating in said high temperature nuclear reactor a heat exchange medium to a temperature sufficiently high to sustain an endothermic reaction; causing indirect heat exchange between at least one reactant capable of being subjected to said endothermic reaction and said thus-heated heat exchange medium so as to cause said endothermic reaction to proceed under formation of a reaction product capable of being reconverted into said at least one reactant by being subjected to an exothermic reaction; stabilizing said reaction product against undersired reconversion; and initiating said exothermic reaction of said reaction product in indirect heat exchange with a medium to be heated at a time when heating of said medium is desired, so that said medium will be heated with heat freed by said exothermic reaction and simultaneously said at least one reactant will be reformed.

2. A method as defined in claim 1, wherein said stabilized reaction product is stored prior to being subjected to said exothermic reaction.

3. A method as defined in claim 1, wherein said endothermic chemical reaction causes decomposition of said at least one reactant, a stabilizing agent capable of retarding said exothermic reaction is admixed to said reaction product, and the thus-formed stabilized mixture is stored prior to being subjected to said exothermic reaction.

4. A method as defined in claim 1, wherein said reformed at least one reactant is recycled for being subjected to said indirect heat exchange with said heated heat exchange medium so as to be reconverted by said endothermic reaction into said reaction product, thereby causing said endothermic and exothermic reactions to be carried out in a closed cycle.

5. A method as defined in claim 1, wherein said at least one reactant is ethane, and said reaction product consists of ethylene and hydrogen.

6. A method as defined in claim 5, wherein said ethane is decomposed at about 900° C. and at about atmospheric pressure, and the mixture of ethylene and hydrogen formed thereby is quickly cooled to a temperature below 400° C., prior to being subjected to said exothermic reaction.

7. A method as defined in claim 6, wherein said mixture is quickly cooled to 25° C.

8. A method as defined in claim 5, wherein an inert diluent is admixed to the mixture of ethylene and hydrogen.

9. A method as defined in claim 8, wherein said inert diluent is selected from the group consisting of nitrogen and noble gases.

10. A method as defined in claim 1, wherein said at least one reactant is propane and said reaction product consists of propylene and hydrogen.

11. A method as defined in claim 10, wherein said propane is decomposed at about 900° C. and at about atmospheric pressure, and the thus-formed mixture of propylene and hydrogen is quickly cooled to a temperature below 400° C.

12. A method as defined in claim 11, wherein said quick cooling is carried out in indirect heat exchange with a heat exchange medium.